United States Patent
Arakelian

(12) 
(10) Patent No.: US 6,273,588 B1
(45) Date of Patent: *Aug. 14, 2001

(54) SUBMERSIBLE LAMP AND WATERPROOF CABLE ENTRY FOR USE THEREWITH

(75) Inventor: Richard Arakelian, Baulkham Hills (AU)

(73) Assignee: Ark Engineering Pty, Ltd., Arndell Park (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/184,564

(22) Filed: Nov. 2, 1998

(30) Foreign Application Priority Data

Nov. 3, 1997 (AU) .................................... PP0142

(51) Int. Cl.$^7$ ............................. F21V 31/00; B60Q 1/26
(52) U.S. Cl. ...................... 362/267; 362/310; 362/540; 362/549
(58) Field of Search .................................. 362/267, 310, 362/540, 541, 548, 549

(56) References Cited

U.S. PATENT DOCUMENTS

| | | | |
|---|---|---|---|
| 3,612,852 | * | 10/1971 | Bogossian ............................. 362/485 |
| 3,949,212 | * | 4/1976 | Larrimore ............................. 362/267 |
| 4,259,710 | * | 3/1981 | Schlack ................................ 362/267 |
| 4,569,008 | * | 2/1986 | Creaser ................................ 362/362 |
| 4,947,304 | * | 8/1990 | Payne et al. ......................... 362/267 |
| 5,442,525 | * | 8/1995 | Tsukada .............................. 362/267 |
| 5,508,894 | * | 4/1996 | Payne et al. ......................... 362/267 |
| 5,626,413 | * | 5/1997 | Ferrell et al. ........................ 362/267 |
| 5,842,771 | * | 12/1998 | Thrasher et al. ..................... 362/267 |

* cited by examiner

*Primary Examiner*—Sandra O'Shea
*Assistant Examiner*—David V. Hobden
(74) *Attorney, Agent, or Firm*—Steinberg & Raskin, P.C.

(57) ABSTRACT

A submersible lamp including a base member having a waterproof cable entry therethrough, one or more bulb holders mounted to the base member, a lamp cover positioned over the bulb holder(s), and an at least partially transparent over cover extending over the lamp cover and engaging with the base member in a sealing relationship so that the base member, the waterproof cable entry and the over cover together form a waterproof enclosure. The waterproof cable entry, which may be used independent of the submersible lamp, includes a housing through which a cable is adapted to pass, an elastomeric plug adapted to fit within a bore of the housing, and a securing device for urging the plug into the bore and secure the plug within the housing.

14 Claims, 4 Drawing Sheets

FIG. 5
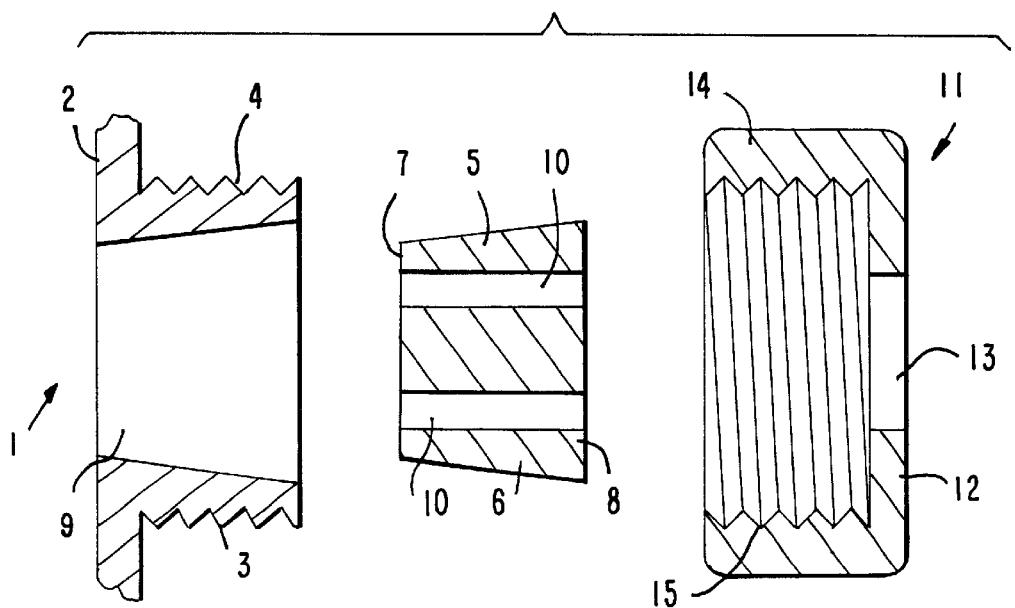
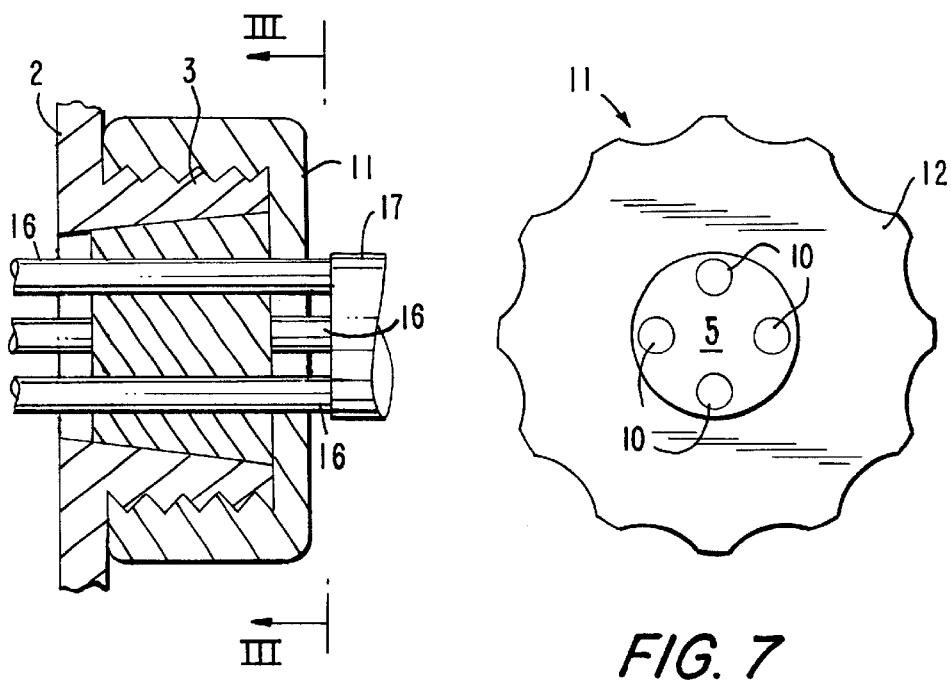
FIG. 6
FIG. 7

SUBMERSIBLE LAMP AND WATERPROOF CABLE ENTRY FOR USE THEREWITH

FIELD OF THE INVENTION

This invention generally relates to a submersible lamp and to a waterproof cable entry for a submersible lamp, and more particularly, though not solely, to a waterproof cable entry for use in a submersible tail lamp fittable on a boat trailer or the like.

BACKGROUND OF THE INVENTION

In the past, it has been particularly difficult to provide a completely waterproof submersible lamp which is able to withstand knocks and vibrations in use while being able to maintain waterproof integrity. This problem is particularly manifest in the tail lights of boat trailers but can also be present in other motor vehicle situations, and in other locations such as in underwater lights in swimming pools or in areas which are often subjected to high pressure water treatment.

In a trailer-like situation, the problem is made worse by the necessity to provide different colored lenses within a single light. For example, the tail and brake lights of a motor vehicle must have a red lens, the turn indicator light must have an amber lens and there is also often the necessity to provide a clear lens section for illuminating the adjacent number plate of the trailer or other motor vehicle. It has proven extremely difficult to manufacture conventional combined tail/stop/indicator/number plate lights which will maintain waterproof integrity at the joints of the various different colored lamp segments. It is of course possible to provide individual lamps for each of the above functions but this significantly increases the cost and also the complexity and "untidiness" on the motor vehicle.

The legal requirements of many countries also make it necessary for the various lenses to have certain light focusing or diffracting characteristics and it has proven extremely difficult to provide these characteristics in a waterproof tail light or indicator light lens of the type described above.

There are also many situations where it is desirable to provide a waterproof entry for an electrical cable into an apparatus. In the past, in some instances, an elastomeric collar or O-ring is provided which forms an interference fit with the outer sheath of the cable to inhibit the influx of water. In other cases, the cable passes through a bush or collar and is "potted" in place using a setting chemical compound such as a silicon based compound or an epoxy resin. Such waterproof entries can work loose over time, particularly in situations subject to high vibration or stress loadings which will then allow the ingress of water into the apparatus. Furthermore, if the outer sheath of a multi-conductor electrical cable becomes ruptured or pierced, water can enter into the housing through the cable sheath, even if the entry point remains intact about the external perimeter of the sheath.

OBJECTS AND SUMMARY OF THE INVENTION

It is an object of the present invention to provide new and improved submersible lamps or lights.

It is another object of the present invention to provide a submersible lamp having a waterproof cable entry.

It is yet another object of the present invention to provide a new and improved waterproof cable entry for an apparatus such as a submersible light.

In order to achieve these objects and others, a submersible lamp in accordance with the invention comprises a base member having a waterproof cable entry arranged in connection therewith, at least one bulb holder mounted to the base member, a lamp cover positioned over the bulb holder, and an at least partially transparent over cover extending over the lamp cover and engageable with the base member in a sealing relationship so that the base member, waterproof cable entry and over cover together form a waterproof enclosure.

Preferably, the lamp cover is mounted directly or indirectly to the base member.

Also, the transparent over cover may be engaged with the base member in a sealing relationship by providing an elastomeric sealing strip or member between the over cover and the base member.

The over cover preferably has a peripheral flange adapted to mate with a corresponding area on the base member, e.g., the front surface thereof, and the elastomeric sealing member may comprise an O-ring or the like located in a suitable groove in one of the base member or the peripheral flange on the over cover.

Further, the transparent over cover may be detachably engageable with the base member by means of fastening members, such as bolts or screws, passing through the peripheral flange in the over cover and through the base member, outside the location of the elastomeric sealing member.

In one embodiment of the invention, the lamp cover incorporates discrete portions having different colors for use as a combined tail indicator light on a motor vehicle, such portions typically including a red portion for use as a tail/brake light, and an amber portion for use as an indicator light. In such an embodiment, individual bulb holders may be provided for each desired function.

The waterproof cable entry in accordance with the present invention for a multi-conductor cable comprises a housing through which the cable passes in use, an elastomeric plug adapted to fit within the housing, and more particularly within a bore of the housing, and securing means adapted to urge the plug into the bore of the housing and secure the plug within the housing. The housing, plug and securing means are arranged to compress the plug as it is urged into the housing. The entry also includes a plurality of holes passing through the plug, one hole for each conductor in the cable so that in use the plug may be threaded onto the conductors of the cable and then compressed within the housing, thereby providing a waterproof seal between the plug and each conductor, and between the plug and the housing. The waterproof cable entry may be used in the submersible lamp described above or any other type of electrical apparatus.

Preferably, the housing is cylindrical in configuration and the plug has a substantially circular cross-section.

Also, at least one of the housing and the plug are preferably tapered, causing the plug to be compressed as it is urged into the housing.

The securing means may comprise a threaded cap adapted to be engaged with a male thread on the outside of the housing, the cap having a hole therethrough for passage of the cable.

DESCRIPTION OF THE DRAWINGS

A more complete appreciation of the present invention and many of the attendant advantages thereof will be readily understood by reference to the following detailed description when considered in connection with the accompanying drawings in which:

FIG. 5 is an exploded cross-sectional elevation to an enlarged scale of a waterproof cable entry according to the invention;

FIG. 6 is another cross-sectional elevation showing the cable entry assembled with a cable passing therethrough; and FIG. 7 is a cross-sectional view on the line III—III of FIG. 6.

DETAILED DESCRIPTION OF THE PREFERRED EMBODIMENTS

In a preferred form of the invention, a waterproof rear light for a motor vehicle such as a boat trailer will now be described, although it will be appreciated that the invention can be applied to other forms of lamps such as submerged pool lights or lights used in other submerged situations or areas which are exposed to water.

Figure 3:
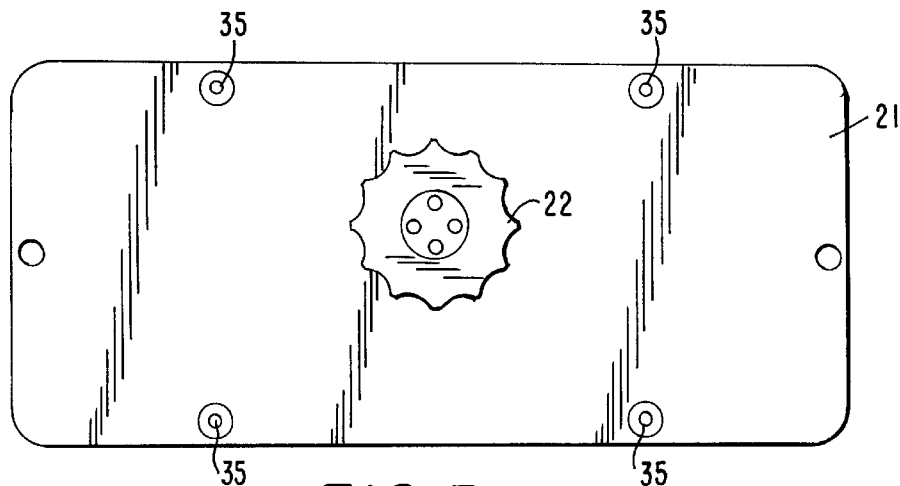
FIG. 3 is a rear view of the lamp shown in FIGS. 1 and 2.
Figure 2:
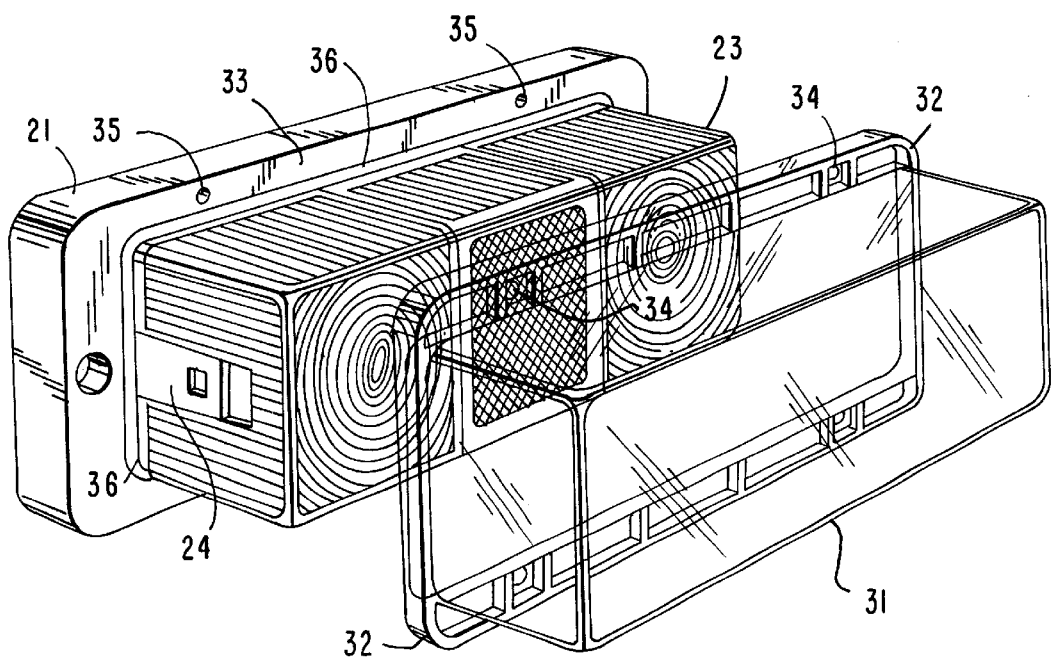
FIG. 2 is an exploded view of the lamp shown in FIG. 1, showing the transparent over cover removed.
Figure 4A:
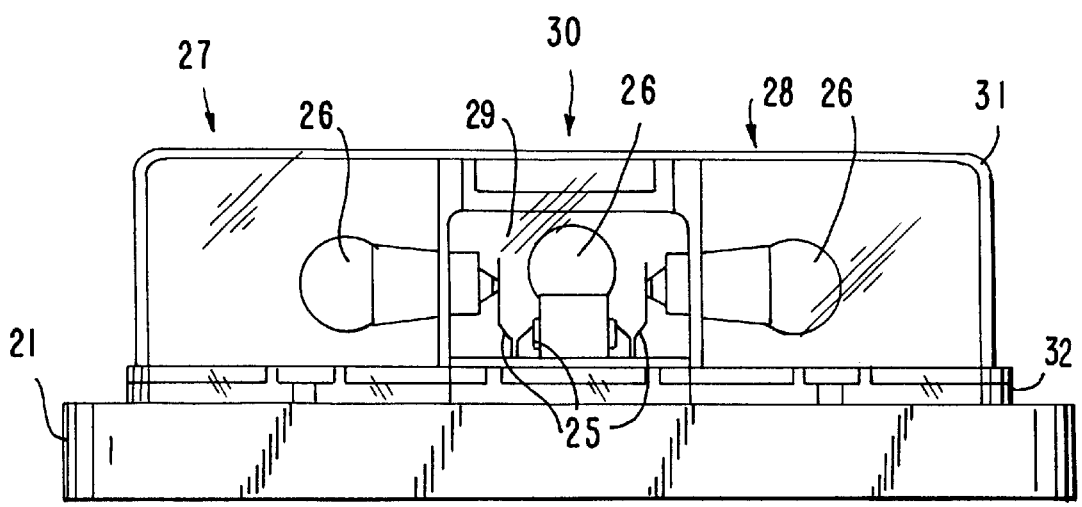
FIG. 4a is a cross-sectional view of the lamp shown in FIG. 4.

Referring to the drawings wherein like reference characters designate identical or corresponding parts throughout the several views, a submersible boat trailer lamp 20 in accordance with the invention comprises a base member 21 having a waterproof cable entry 22 arranged in connection therewith (FIG. 3) and a lamp cover 23 mounted to the base member, for example by way of mounting clips 24 (FIG. 2). The lamp cover 23 may either be mounted directly on the base member 21 or indirectly as desired.

The lamp is provided with one or more bulb holders 25 (FIG. 4) in which are mounted light bulbs 26 positioned for appropriate use of the lamp 20.

Figure 1:
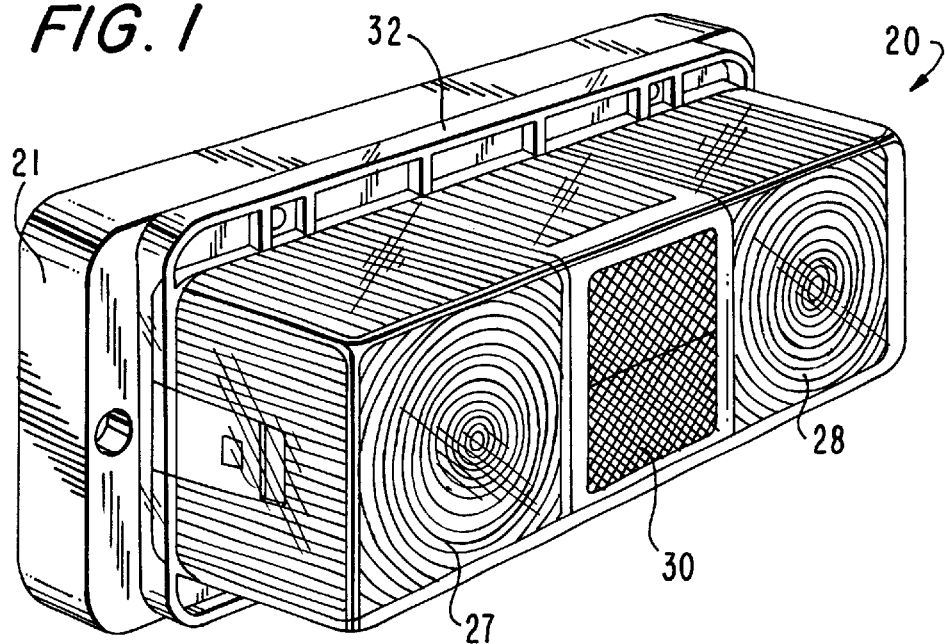
FIG. 1 is a perspective view of a submersible lamp in accordance with the invention in the form of a combined brake and indicator light for the rear of a motor vehicle.
Figure 4:
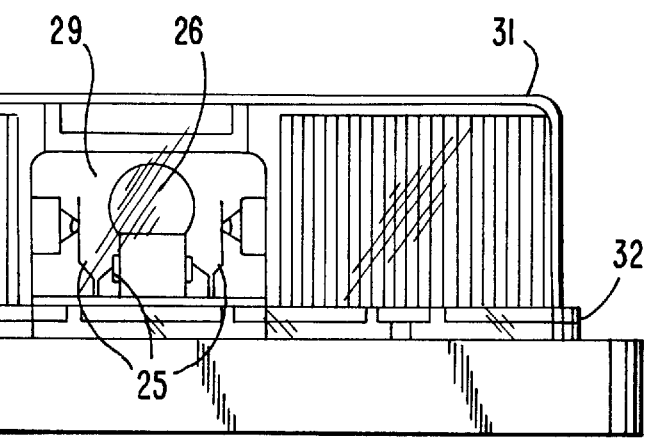
FIG. 4 is a bottom view of the lamp shown in FIGS. 1 and 2.

By way of example only, where the lamp 20 is used as the rear tail light on a motor vehicle such as a boat trailer, the lamp cover 23 may incorporate a red lens portion 27 for the brake/tail light of the motor vehicle, an amber lens portion 28 for the indicator light portion and a clear lens portion 29 on the bottom of the lamp cover 23 (as shown in FIGS. 1 and 4) for use in illuminating an adjacent number plate. Where desired, a reflectorized portion 30 may conveniently be provided, e.g., integrated into the lamp cover 23, between the red and amber lenses 27 and 28. Red and amber lenses 27,#28 may be provided with suitable focusing or "fresnel" lens configurations as shown in FIGS. 1 and 2.

The submersible lamp is further provided with an at least partially transparent over cover 31 which is typically molded from a high impact resistant plastic material and which is sized and shaped to fit neatly over the lamp cover 23.

The over cover 31 is provided with a peripheral flange 32 arranged to mate with a corresponding front surface 33 on the base member 21. The over cover 31 is held in place on the base member 21 by suitable fastening means such as bolts or screws (not shown) passing through holes 34 in the transparent over cover 31 and through corresponding holes 35 in the base member 21. The over cover 31 forms a waterproof enclosure in combination with the base member 21 by way of sealing means in the form of an elastomeric sealing strip or member between the transparent over cover 31 and the base member 21. In one preferred form of the invention, the elastomeric sealing member is in the form of an O-ring 36 located within a groove formed in the front surface 33 of the base member 21 in a position adjacent the base of the lamp cover 23.

When the transparent over cover 31 is assembled over the lamp cover 23 onto the base member 21, the peripheral flange 32 seats on the O-ring 36 and forms a completely water tight seal once the screws or bolts are engaged through the aligning holes 34 and 35. The flange 32 may also include a groove for receiving the O-ring 36.

The submersible lamp is further provided with a waterproof cable entry 22 typically located in the center of the base member 21, which will now be described in more detail.

In one preferred form of the invention, the waterproof cable entry is provided for the housing of a submersible trailer light on a boat trailer which enables four electrical conductors to be passed through the entry into the body of the waterproof light. It will be appreciated that the cable entry can be adapted to other situations and used with other numbers of individual conductors.

When used for a submersible trailer light, the lamp 20 will typically incorporate individual bulbs for a brake light, flashing turn indicator light, and a number plate illuminating lamp which together with a common return conductor requires the passage of four individual conductors.

With reference to FIGS. 5–7, the cable entry typically takes place through an aperture 1 in the wall 2 of a housing such as the back plate for a submersible trailer light. The housing is typically molded from a plastic material but may of course be formed in any other manner from any suitable material. The housing may be the base member 21 discussed above.

The cable entry comprises a housing 3 through which the cable passes and which typically is cylindrical and provided with an external (male) thread 4, i.e., a thread on an outer surface thereof.

An elastomeric plug 5 is provided and is formed from rubber or synthetic rubber, or any other suitable elastomeric material, and has the general configuration of a cork with a circular cross-section and a tapered cylindrical surface 6 which flares outwardly from a smaller diameter end 7 to a larger diameter end 8. The end 7 is sized to be readily inserted within a bore 9 of the housing 3 and the taper is designed to compress the plug 5 as it is urged or forced into the housing 3.

To this end, the same effect may be achieved by providing a tubular plug and a taper to the bore 9, or alternatively corresponding tapers on both the plug 5 and the bore 9 as shown in FIG. 5.

The plug 5 is provided with a plurality of parallel longitudinal holes 10 passing through the plug 5 from one end 7 to the other end 8. The number of holes 10 corresponds to the number of conductors in the cable desired to be used with the waterproof cable entry.

The entry further comprises securing means in the form of a cap 11 which has a top 12 with an aperture 13 therethrough sized for passage of the cable, and a skirt 14 incorporating an internal or female thread 15 sized and configured to mate with the male thread 4 on the cylindrical housing 3.

The larger diameter end 8 of the plug 5 is sized to fit within the cap 11.

In use, each individually insulated conductor of a multistrand cable is threaded through one of the holes 10 in the plug 5 until all of the conductors are threaded through the corresponding holes. The cap 11 is also threaded over the cable by passing the cable through aperture 13.

The plug 5 containing the conductors is then inserted into the bore 9 of housing 3 so that the cap 11 engages with thread 4. As the cap 11 is rotated and threaded onto the housing 3, it forces or urges the plug 5 into the bore 9, compressing the plug and squeezing the elastomeric material of the plug 5 tightly around each individual conductor 16 as shown in FIG. 2. Once so engaged, there is a waterproof seal provided between each conductor 16 of the cable and the elastomeric plug 5, and between the cylindrical face 6 of the plug 5 and the bore 9 of the housing 3.

In this manner, a waterproof cable entry is provided which is simple and quick to install and which results in a secure waterproof entry that is not prone to deterioration or leaking through degradation from vibration or other causes. Furthermore, because each conductor is individually sealed within the plug 5, the integrity of the waterproof entry is maintained even if the cable sheath 17 should be ruptured or pierced allowing water to enter the sheath.

The cable entry can be disassembled at any time and reassembled without losing the viability of the waterproof seal or requiring factory conditions to reinstate the seal.

The submersible lamp also has the advantage of simplicity in manufacture and assembly while providing a completely waterproof enclosure which can withstand vibration and hard knocks while maintaining its waterproof integrity. Since the transparent over cover is provided as a separate member from the lamp cover, the lamp cover may be optimized for its desired use. For example, when used as the tail light on a motor vehicle, portions of the lamp cover may be provided with the desired "fresnel" lens configurations and different colors may be used in different parts of the lamp cover without concern for waterproof integrity of the lamp cover itself.

Obviously, numerous modifications and variations of the present invention are possible in light of the above teachings. Accordingly, it is understood that other embodiments of the invention are possible in the light of the above teachings.

I claim:

1. A submersible lamp, comprising
   a base member having a waterproof cable entry arranged in connection therewith,
   a plurality of bulb holders coupled to said base member,
   a light bulb mounted in each of said plurality of bulb holders;
   a lamp cover positioned over said plurality of bulb holders, said lamp cover including a plurality of discrete lamp portions attached together with a wall separating each portion, each lamp portion housing a respective one of said light bulbs, and
   an at least partially transparent over cover extending over said lamp cover and engaging with said base member in a sealing relationship so that said base member, said waterproof cable entry and said over cover together form a waterproof enclosure.

2. The submersible lamp of claim 1, further comprising
   sealing means for providing a seal between said over cover and said base member.

3. The submersible lamp of claim 2, wherein said sealing means comprise an elastomeric sealing strip arranged between said over cover and said base member.

4. The submersible lamp of claim 1, wherein said over cover includes a peripheral flange and said base member includes a surface adapted to cooperate with said peripheral flange.

5. The submersible lamp of claim 4, wherein one of said surface of said base member and said peripheral flange include a groove, further comprising
   sealing means for providing a seal between said over cover and said base member, said sealing means comprising an O-ring arranged in said groove in said one of said surface of said base member and said peripheral flange.

6. The submersible lamp of claim 1, further comprising fastening means for detachably fastening said over cover to said base member.

7. The submersible lamp of claim 6, wherein said over cover includes a peripheral flange and said base member includes a surface adapted to cooperate with said peripheral flange, further comprising
   sealing means for providing a seal between said peripheral flange of said over cover and said base member, said sealing means comprising an elastomeric sealing strip arranged between said base member and said peripheral flange,
   said fastening means being arranged to pass through said peripheral flange and said base member outside the location of said elastomeric sealing strip.

8. The submersible lamp of claim 1, wherein said waterproof cable entry comprises
   a housing having a bore,
   an elastomeric plug adapted to fit within said bore of said housing, and
   securing means for urging said plug into said bore of said housing and securing said plug within said housing.

9. The submersible lamp of claim 8, wherein said waterproof cable entry further includes a plurality of holes passing through said plug, each of said holes being receivable of a respective conductor of the cable.

10. The submersible lamp of claim 8, wherein said bore of said housing is cylindrical and said plug has a substantially circular cross-section.

11. The submersible lamp of claim 8, wherein at least one of said bore of said housing and said plug is tapered to thereby cause the plug to be compressed as it is urged into said bore of said housing.

12. The submersible lamp of claim 8, wherein said housing includes a thread on an outer surface thereof, said securing means comprising a cap having an internal thread adapted to cooperate with said thread on said outer surface of said housing.

13. The submersible lamp of claim 12, wherein said cap includes a hole for passage of the cable.

14. The submersible lamp of claim 1, wherein said transparent over cover is a unitary over cover formed from a single piece of material.

* * * * *